United States Patent
Ren

(10) Patent No.: US 11,886,070 B2
(45) Date of Patent: Jan. 30, 2024

(54) DISPLAY PANEL AND METHOD OF MANUFACTURING THE DISPLAY PANEL

(71) Applicant: Shenzhen China Star Optoelectronics Semiconductor Display Technology Co., Ltd., Guangdong (CN)

(72) Inventor: Wei Ren, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 700 days.

(21) Appl. No.: 16/754,172

(22) PCT Filed: Dec. 18, 2019

(86) PCT No.: PCT/CN2019/126270
§ 371 (c)(1),
(2) Date: Apr. 7, 2020

(87) PCT Pub. No.: WO2021/109253
PCT Pub. Date: Jun. 10, 2021

(65) Prior Publication Data
US 2021/0173255 A1    Jun. 10, 2021

(30) Foreign Application Priority Data
Dec. 6, 2019   (CN) .......................... 201911240319.0

(51) Int. Cl.
*G02F 1/1335*    (2006.01)

(52) U.S. Cl.
CPC .............................. *G02F 1/133516* (2013.01)

(58) Field of Classification Search
CPC . G02F 1/133516; G02F 1/1343; G02F 1/1333
See application file for complete search history.

(56) References Cited

U.S. PATENT DOCUMENTS

| 2003/0008133 A1 | 1/2003 | Paik et al. | |
| 2008/0018841 A1* | 1/2008 | Rho | G02F 1/1337 216/14 |
| 2009/0227076 A1* | 9/2009 | Miyairi | H01L 21/764 257/E21.535 |

(Continued)

FOREIGN PATENT DOCUMENTS

| CN | 1355907 A | 6/2002 |
| CN | 103293736 A | 9/2013 |

(Continued)

*Primary Examiner* — Michael H Caley
*Assistant Examiner* — Agnes Dobrowolski
(74) *Attorney, Agent, or Firm* — PV IP PC; Wei Te Chung; Zhigang Ma

(57) ABSTRACT

A display panel and a method of manufacturing the display panel are provided. The display panel includes a color filter substrate, a first conductive layer, a thin film transistor substrate, a second conductive layer, a first pad group, a second pad group, and a conductive adhesive strip. The conductive adhesive strip includes a plurality of metal particles, and different metal particles have different contact resistances and voltage drops, so that the signal voltage is effectively distributed during alignment.

15 Claims, 2 Drawing Sheets

(56) References Cited

U.S. PATENT DOCUMENTS

| | | | |
|---|---|---|---|
| 2014/0036181 A1* | 2/2014 | Kamon | H05K 3/361 |
| | | | 174/254 |
| 2014/0104251 A1* | 4/2014 | Zhang | G09G 3/3648 |
| | | | 438/30 |
| 2020/0411805 A1* | 12/2020 | Yu | H01L 51/56 |

FOREIGN PATENT DOCUMENTS

| | | | |
|---|---|---|---|
| CN | 103440934 A | | 12/2013 |
| CN | 203746444 | * | 7/2014 |
| CN | 203746444 U | | 7/2014 |
| CN | 109212850 A | | 1/2019 |

* cited by examiner

DISPLAY PANEL AND METHOD OF MANUFACTURING THE DISPLAY PANEL

CROSS-REFERENCE TO RELATED APPLICATIONS

The present disclosure claims priority to China Patent Application No. 201911240319.0, filed on Dec. 6, 2019, and titled "DISPLAY PANEL AND METHOD OF MANUFACTURING THE DISPLAY PANEL", the contents of which are incorporated in to the present disclosure.

BACKGROUND OF INVENTION

Field of Invention

The present invention relates to the field of display technology, and more particularly, to a display panel and a method of manufacturing the display panel.

Description of Prior Art

Liquid crystal display (LCD) panels have been widely used in various fields due to their thinness and low power consumption.

Indium tin oxide (ITO) film is one of the main materials used in LCD panels. The ITO film is an n-type semiconductor material with high conductivity, high mechanical hardness, high visible light transmittance, and good chemical stability, and thus it is often used to manufacture the panels.

In the display panel manufacturing process, with the development of next-generation linear polymer stabilized vertically aligned liquid crystal technology (PSVA), the liquid crystals need to be powered and aligned, and after the high quality vertical alignment (HVA) type liquid crystals are applied with power, it is necessary to use an ITO film laser cutting machine to cut the ITO film on the color filter (CF) substrate, so as to divide a plurality of display panel areas insulated from each other on the ITO film of the CF substrate. Meanwhile, it is necessary to further apply conductive glue to a plurality of pads on the display panel, so that the CF substrate and corresponding pads on the thin film transistor (TFT) substrate can be combined with each other through conductive adhesive strips to form a display panel.

However, due to a large number of chips on the display panel and complicated distribution of the solidified metal wires on the periphery of the display panel, it is not possible to distribute a variety of signal voltages on the conductive adhesive strip, which affects the signal voltage transmission on the display panel.

Therefore, it needs to solve the problems in the prior art.

SUMMARY OF INVENTION

Currently, in the liquid crystal alignment of the display panel and the conductive adhesive curing technologies, the liquid crystals cannot be well-powered and aligned. Also, in the process of applying current to the liquid crystals, various signal voltages cannot be effectively distributed.

In order to solve the above problems, a display panel and a method of manufacturing the display panel are provided. They solve the problems in the existing display panel technology. For example, the liquid crystals cannot be well-powered and aligned, and in the process of applying current to the liquid crystals, various signal voltages cannot be effectively distributed.

A display panel comprises:
a color filter substrate;
a first conductive layer disposed on the color filter substrate;
a thin film transistor substrate, and the thin film transistor substrate is disposed opposite to the color filter substrate;
a second conductive layer disposed on the thin film transistor substrate;
a first pad group, and the first pad group is disposed at an edge region of the color filter substrate;
a second pad group, and the second pad group is disposed on the thin film transistor substrate and is opposite to the first pad group; and
a conductive adhesive strip, and the first pad group is electrically connected to the second pad group through the conductive adhesive strip, the conductive adhesive strip comprises a plurality of metal particles, a diameter of the metal particles is different from each other, and the first pad group comprises a plurality of first pads.

In one embodiment, the metal particles comprise gold.

In one embodiment, the second pad group comprises a plurality of second pads.

In one embodiment, the conductive adhesive strip has different impedances in different regions.

In one embodiment, the first conductive layer comprises an indium tin oxide thin film.

In one embodiment, the second conductive layer comprises an indium tin oxide thin film.

A display panel comprises:
a color filter substrate;
a first conductive layer disposed on the color filter substrate;
a thin film transistor substrate, and the thin film transistor substrate is opposite to the color filter substrate;
a second conductive layer disposed on the thin film transistor substrate;
a first pad group, and the first pad group is disposed at an edge region of the color filter substrate;
a second pad group, and the second pad group is disposed on the thin film transistor substrate and is opposite to the first pad group; and
a conductive adhesive strip, and the first pad group is electrically connected to the second pad group through the conductive adhesive strip, the conductive adhesive strip comprises a plurality of metal particles.

In one embodiment, the metal particles comprise gold.

In one embodiment, a diameter of the metal particles is different from each other.

In one embodiment, the first pad group comprises a plurality of first pads.

In one embodiment, the second pad group comprises a plurality of second pads.

A method of manufacturing a display panel comprises following steps:
S100, providing a color filter substrate and a thin film transistor substrate;
S101, disposing a first conductive layer and a first pad group on the color filter substrate, and disposing a second conductive layer and a second pad group on the thin film transistor substrate;
S102: cutting the first conductive layer along an etching path reserved on the color filter substrate to form a plurality of color filter substrate units, and cutting the second conductive layer along an etching path reserved on the thin film transistor substrate to form a plurality of thin film transistor substrate units; and S103, adding metal particles in the conductive adhesive strip, and coating the conductive adhesive strip on the first pad group and the second pad group.

In one embodiment, the method further comprises an assembly step, and the color filter substrate is disposed opposite to the thin film transistor substrate, and the first pad group is disposed opposite to the second pad group.

In one embodiment, liquid crystals are filled between the color filter substrate and the thin film transistor substrate.

In one embodiment, the method further comprises a test step, and the test step comprises inputting a voltage signal to the color filter substrate through the conductive adhesive strip to perform an electrical test.

In one embodiment, the first pad group is electrically connected to the second pad group through the conductive adhesive strip.

In one embodiment, the metal particles comprise gold.

In one embodiment, the first conductive layer and the second conductive layer comprise an indium tin oxide thin film.

A display panel and a method of manufacturing the display panel are provided. A first pad group, a second pad group, and a conductive adhesive strip are provided, metal particles are added into the conductive adhesive strip, and the metal particles have different diameters different voltage drops, thereby generating different voltage drops and conduction performances, and then the HVA liquid crystal may effectively be aligned and transmit the voltage signal to realize the process of voltage drop and voltage distribution.

DETAILED DESCRIPTION OF PREFERRED EMBODIMENTS

The following descriptions of the embodiments are made with reference to additional drawings to illustrate specific embodiments that the present invention can be implemented.

Figure 1:
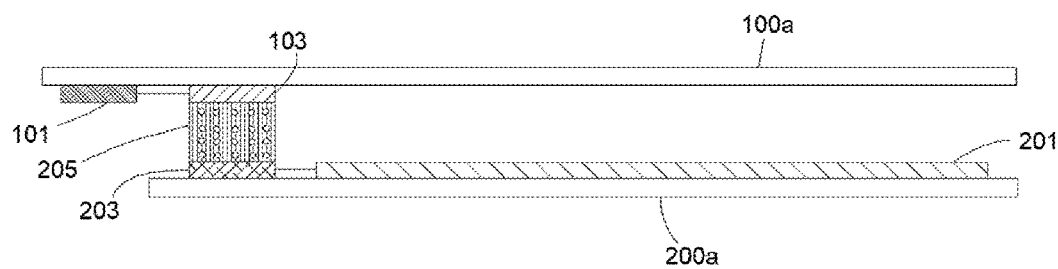
FIG. 1 is a schematic view of a display panel according to one embodiment of the present invention.

In order to solve the problems of poor liquid crystal alignment and poor alignment voltage drop distribution in the existing display panel, a display panel provided. Referring to FIG. 1, it is a schematic view of a display panel according to one embodiment of the present invention. The display panel comprises a color filter substrate 100a, a first conductive layer 101, a first pad group 103, a thin film transistor substrate 200a, a second conductive layer 201, a second pad group 203, and a conductive adhesive strip 205.

Specifically, the color filter substrate 100a is disposed opposite to the thin film transistor substrate 200a. The first conductive layer 101 is disposed on the color filter substrate 100a, and is specifically disposed on a surface opposite to the thin film transistor substrate 200a. A first pad group 103 is further disposed in the edge region of the first pad group 103, and the first pad group 103 is electrically connected to the first conductive layer 101. The second conductive layer 201 is disposed on the thin film transistor substrate 200a, and the second pad group 203 is disposed on the thin film transistor substrate 200a. The first pad group 103 is disposed opposite to the second pad group 203. Meanwhile, the first pad group 103 is electrically connected to the second pad group 203 through a conductive adhesive strip 205.

During applying a current to the liquid crystals, voltage signal is introduced from the first conductive layer 101 on the color filter substrate 100a, and then is sequentially transmitted to the first pad group 103, the conductive adhesive strip 205, and the second pad group 203. Finally, voltage signal is transmitted to the second conductive layer 201 on the thin film transistor substrate 200a to achieve the voltage transmission in the display panel and the alignment of the liquid crystals.

In order to better distribute the voltage signal, metal particles are added into the conductive adhesive strip 205. While applying the voltage, the required voltage is different in different curing areas of the display panel.

The metal particles according to one embodiment may cause different contact resistances at different contact points of the conductive adhesive strip 205. Impedance distribution is performed according to the voltage value required for different contact points.

When the voltage signal is transmitted from the color filter substrate 100a to the conductive adhesive strip 205, a certain voltage drop level is occurred due to the metal particles.

Finally, the voltages reaching the thin film transistor substrate 200a are basically the same, thereby ensuring the voltages in the entire display panel mat be controlled and achieving better voltage drop distribution.

The above-mentioned metal particles comprise gold (Au) or silver (Ag). In the conductive adhesive strip 205, a diameter of the metal particles is different from each other, and the metal particles with different diameters have different conductivity, so that the voltage in different regions can be better controlled.

The first conductive layer 101 and the second conductive layer 201 are transparent indium tin oxide thin film layers.

Figure 2:
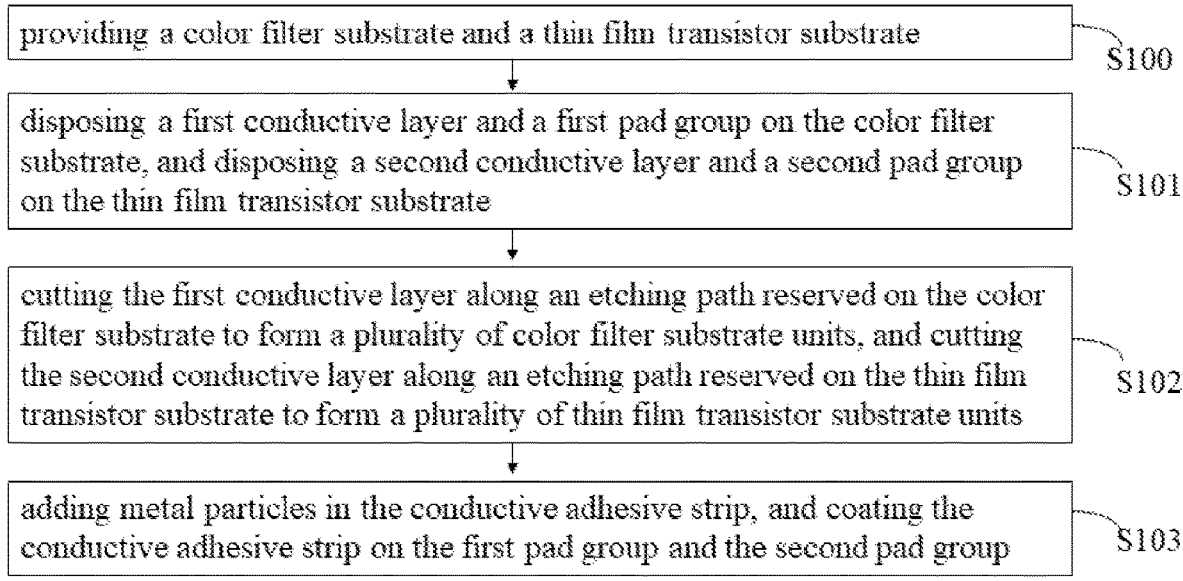
FIG. 2 is a flowchart of a method of manufacturing the display panel according to one embodiment of the present invention.

A method of manufacturing a display panel is also provided. Referring to FIG. 2, it is a flowchart of a method of manufacturing a display panel according to one embodiment of the present invention.

Specifically, the method comprises following steps:

S100, providing a color filter substrate and a thin film transistor substrate. The color filter substrate and the thin film transistor substrate are base materials, and each small substrate unit is formed on the base material.

S101, disposing a first conductive layer and a first pad group on the color filter substrate, and disposing a second conductive layer and a second pad group on the thin film transistor substrate. The first pad group comprises a plurality of first pads, and the second pad group comprises a plurality of second pads.

S102: cutting the first conductive layer along an etching path reserved on the color filter substrate to form a plurality of color filter substrate units, and cutting the second conductive layer along an etching path reserved on the thin film transistor substrate to form a plurality of thin film transistor substrate units.

S103, adding metal particles in the conductive adhesive strip, and coating the conductive adhesive strip on the first pad group and the second pad group.

After the above manufacturing processes are completed, the method further comprises an assembly step and a testing step. Specifically, when assembling the display panel, the color filter substrate is disposed opposite to the thin film transistor substrate. The first pad group is disposed opposite to the second pad group, and liquid crystals are filled between the color filter substrate and the thin film transistor substrate. When testing the display panel, inputting a voltage signal to the color filter substrate through the conductive adhesive strip performs an electrical test.

Figure 3:
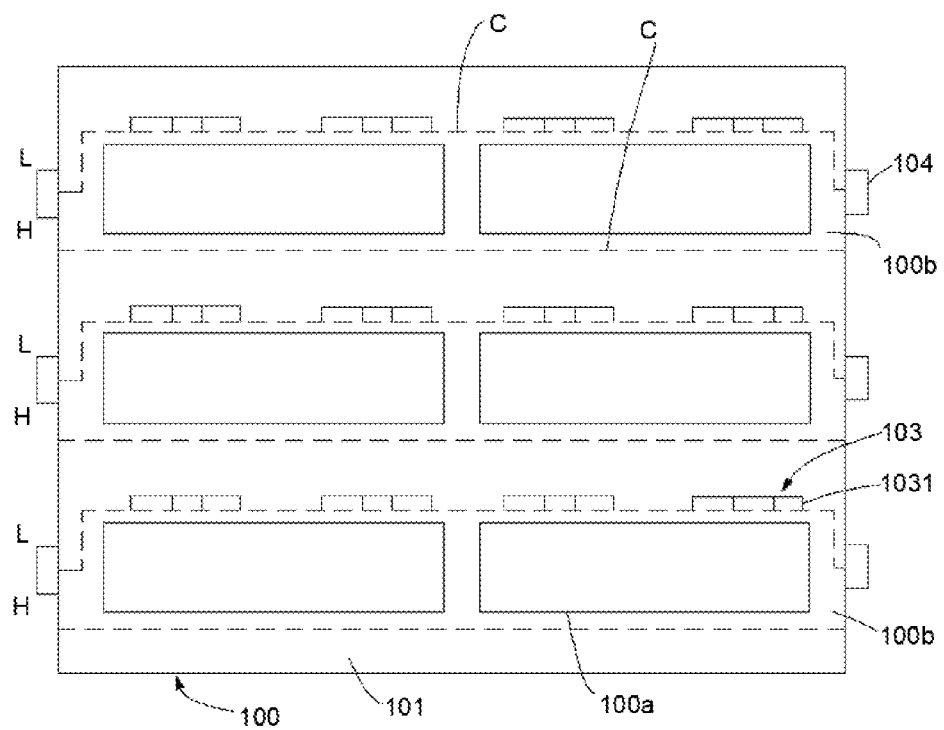
FIG. 3 is a top view of a color filter substrate of the display panel according to one embodiment of the present invention.

Specifically, in step S102, as shown in FIG. 3, it is a top view of a color filter substrate of a display panel according to one embodiment of the present invention.

The color filter base plate 100 is provided with a first conductive layer 101. Meanwhile, a plurality of color filter substrates 100a are formed on the first conductive layer 101, and a plurality of first pad groups 103 corresponding to the color filter substrates are also formed on the first conductive layer 101. Each of the first pad groups 103 comprises a plurality of first pads 1031.

At the same time, it also includes an electric signal device 104 and cutting path C. The electric signal device mainly provides an external input voltage, and the electric signal device 104 also provides different input signals such as a high voltage signal (H) and a low voltage signal (L). The entire color filter mother substrate can be cut into a plurality of color filter substrate units 100b along the cutting path C. The entire color filter base plate can be cut into a plurality of color filter substrate units 100b along the cutting path C.

Figure 4:
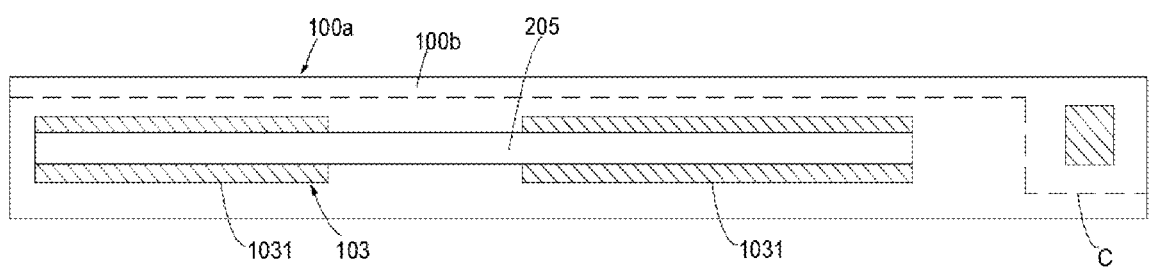
FIG. 4 is a cross-sectional view of the display panel according to one embodiment of the present invention.

Referring to FIG. 4, it is a cross-sectional view of a display panel according to one embodiment of the present invention. FIG. 4 is a partial cross-sectional view after cutting along the laser cutting path C in FIG. 3. With reference to the structures in FIG. 1 and FIG. 3, the color filter substrate 100a comprises a first pad group 103 and a conductive adhesive strip 205 corresponding thereto. The first pad group 103 comprises a plurality of first pads 1031.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A display panel, comprising:
   a color filter substrate;
   a thin film transistor substrate disposed opposite to the color filter substrate;
   a first conductive layer disposed on a side of the color filter substrate facing the thin film transistor substrate;
   a second conductive layer disposed on a side of the thin film transistor substrate facing the color filter substrate;
   a first pad group, is disposed at an edge region of the color filter substrate and on the side of the color filter substrate facing the thin film transistor substrate;
   a second pad group, disposed on the side of the thin film transistor substrate facing the color filter substrate and arranged opposite to the first pad group; and
   a conductive adhesive strip, wherein the first pad group is electrically connected to the second pad group through the conductive adhesive strip, the conductive adhesive strip comprises a plurality of metal particles, the conductive adhesive strip has different impedances in different regions, diameters of the metal particles are different from each other in different regions, and the first pad group comprises a plurality of first pads.

2. The display panel according to claim 1, wherein the metal particles comprise gold.

3. The display panel according to claim 1, wherein the second pad group comprises a plurality of second pads.

4. The display panel according to claim 1, wherein the first conductive layer comprises an indium tin oxide thin film.

5. The display panel according to claim 1, wherein the second conductive layer comprises an indium tin oxide thin film.

6. A display panel, comprising:
   a color filter substrate;
   a thin film transistor substrate disposed opposite to the color filter substrate;
   a first conductive layer disposed on a side of the color filter substrate facing the thin film transistor substrate;
   a second conductive layer disposed on a side of the thin film transistor substrate facing the color filter substrate;
   a first pad group, is disposed at an edge region of the color filter substrate and on the side of the color filter substrate facing the thin film transistor substrate;
   a second pad group disposed on the side of the thin film transistor substrate facing the color filter substrate and arranged opposite to the first pad group; and
   a conductive adhesive strip, wherein the first pad group is electrically connected to the second pad group through the conductive adhesive strip, the conductive adhesive strip comprises a plurality of metal particles, the conductive adhesive strip has different impedances in different regions, and diameters of the metal particles are different from each other in different regions.

7. The display panel according to claim 6, wherein the metal particles comprise gold.

8. The display panel according to claim 6, wherein the second pad group comprises a plurality of second pads.

9. A method of manufacturing a display panel, comprising following steps:
   S100, providing a color filter substrate and a thin film transistor substrate;
   S101, disposing a first conductive layer and a first pad group on a side of the color filter substrate facing the thin film transistor substrate, and disposing a second conductive layer and a second pad group on the thin film transistor substrate, wherein the first pad group and the second pad group are arranged facing each other;
   S102: cutting the first conductive layer along an etching path reserved on the color filter substrate to form a plurality of color filter substrate units, and cutting the second conductive layer along an etching path reserved on the thin film transistor substrate to form a plurality of thin film transistor substrate units; and
   S103, adding metal particles in a conductive adhesive strip, and coating the conductive adhesive strip on the first pad group and the second pad group, wherein the conductive adhesive strip has different impedances in different regions, and diameters of the metal particles are different from each other in different regions.

10. The method of manufacturing the display panel according to claim 9, further comprising an assembly step, wherein the color filter substrate is disposed opposite to the thin film transistor substrate, and the first pad group is disposed opposite to the second pad group.

11. The method of manufacturing the display panel according to claim 10, wherein liquid crystals are filled between the color filter substrate and the thin film transistor substrate.

12. The method of manufacturing the display panel according to claim 9, further comprising a test step, wherein the test step comprises inputting a voltage signal to the color filter substrate through the conductive adhesive strip to perform an electrical test.

13. The method of manufacturing the display panel according to claim 9, wherein the first pad group is electrically connected to the second pad group through the conductive adhesive strip.

14. The method of manufacturing the display panel according to claim 9, wherein the metal particles comprise gold.

15. The method of manufacturing the display panel according to claim 9, wherein the first conductive layer and the second conductive layer comprise an indium tin oxide thin film.

* * * * *